April 22, 1952  J. B. MINOR, SR  2,593,782
TOOL FOR HANDLING SUBSTANTIALLY CYLINDRICAL ARTICLES
Filed April 27, 1951
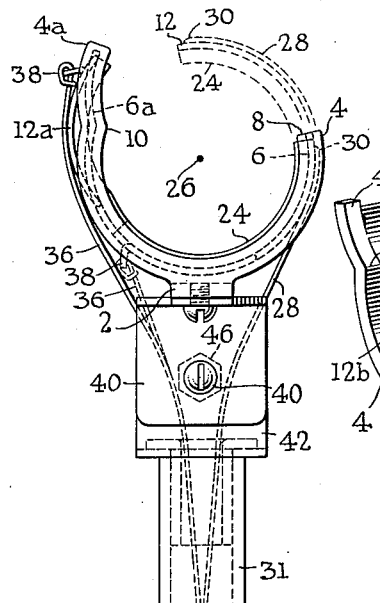
Fig.1
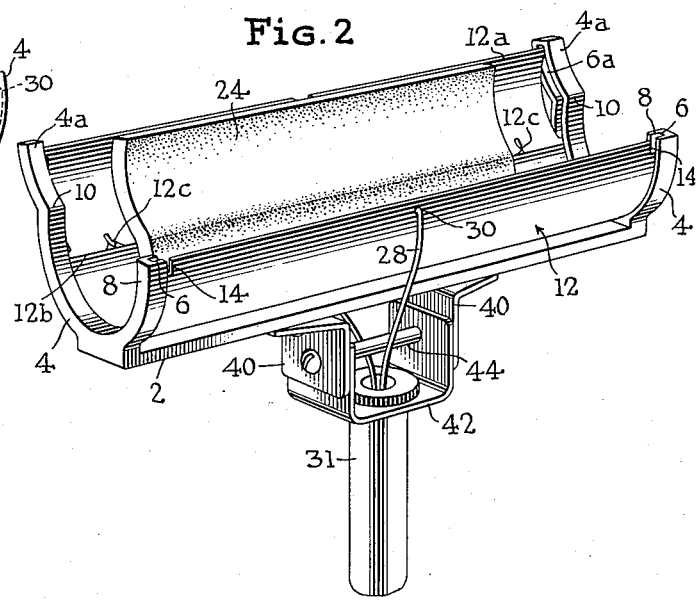
Fig.2
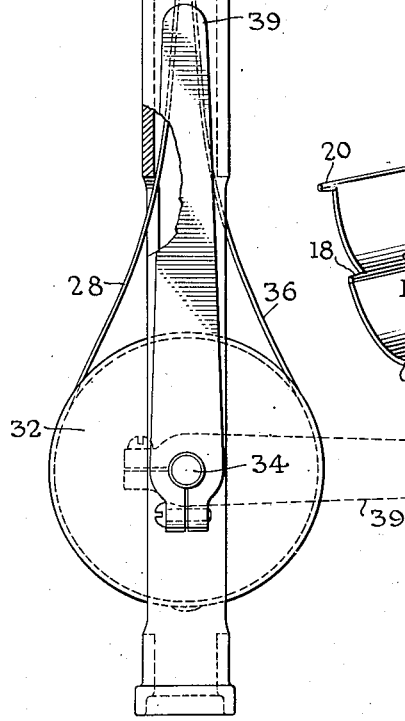
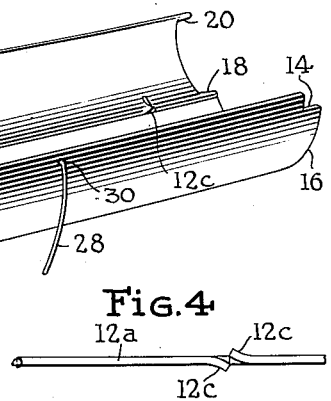
Fig.3
Fig.4
INVENTOR.
James B. Minor, Sr.
BY
Fisher & Christen,
Attorneys.

Patented Apr. 22, 1952

2,593,782

UNITED STATES PATENT OFFICE 2,593,782

TOOL FOR HANDLING SUBSTANTIALLY CYLINDRICAL ARTICLES

James B. Minor, Sr., Fairmont, W. Va.

Application April 27, 1951, Serial No. 223,279

12 Claims. (Cl. 294—21)

1

This invention is a tool for gripping and handling tubular or substantially cylindrical articles generally, and is particularly adapted for applying and removing fluorescent tubes. Fluorescent tubes usually have two electrodes at each end and in applying such tubes the tube is pushed into the fixture through a slot, and is then twisted 90°, to effect electrical contact between the electrodes and the terminals in the fixture. The tubes are removed by reversing this process.

Fluorescent tubes are sometimes difficult of access, being placed near the ceiling or at the far side of a showcase, for example, and one of the principal objects of this invention is to provide a tool having a handle of substantial length, so that the tool will reach the fixture, wherever located, and the tool used to remove an old tube or to insert a new tube, as the case may be.

Another important object of the invention is to provide a tool which will grip the tube, and then twist the tube 90° about its own longitudinal axis, without the necessity of swinging the handle for twisting the tube.

Another important object is to provide a tool which will handle fragile cylindrical articles, such as fluorescent tubes without danger of breakage or injury.

Another important object of the invention is to provide a tube gripping device, which is flexible and which moves generally in a curved path, to the open or closed positions, such flexible member as it approaches the open position being caused to open up in extra wide manner for ready application to or removal from the tube.

More particularly, the tool of this invention comprises a base, at each end of which is a channeled guideway, which guideway is curved, and in which guideway is slidably mounted the ends of a curved flexible tube gripping member.

The major portion of this channeled guideway is preferably uniformly curved, in the curvature of a circle; however, at one side, the curvature of the guideway changes, being angled outwardly so that when the flexible member reaches and travels in this outwardly angled portion of the guideway, it is caused to open out rather widely for ready application to and removal from the tubular or cylindrical member being gripped thereby.

The interior of the curved gripping member is preferably lined with a resilient, non-metallic material, such, for example, as sponge rubber or the like, so as firmly to grip the tubular article so that it can be twisted as necessary but without injury to or scratching of the tube.

2

The invention will be further described in connection with the accompanying drawings illustrating the present preferred embodiment of the invention. In these drawings:

Fig. 1 is a side view partly in section, of the tool of the present invention.

Fig. 2 is a perspective view of the head or top end of the tool.

Fig. 3 is a perspective view of parts of the tool.

Fig. 4 is a view of a detail.

Referring now to these drawings, the head of the tool comprises a base member 2, to each end of which is rigidly secured, as by welding, a channeled guideway 4, the guideway member 4 being provided with arcuately curved channels or grooves 6 facing toward each other. The major portion of each guideway 4 is preferably uniformly curved, preferably circularly, from one end 8 to the point 10, the angular distance from 8 to 10 being approximately 180°. The guideway 4 is provided with a continuation or extension 4a which is angularly positioned outwardly as shown in Figs. 1 and 3. The channel or groove 6 is extended into portion 4a, as indicated at 6a.

The tube contacting and gripping member, indicated generally at 12, is a sheet metal member preferably circularly curved and having an angular extent of about 180°. Cooperating with the member 12 is an extension piece 12a forming a supplementary gripping member, members 12 and 12a meeting in abutting relation along the longitudinal line 12b, so that 12 will push against and move 12a, or 12a will push against and move 12, as the case may be.

Member 12a is arranged to pivot or swing a short distance about the meeting line 12b. In order to maintain 12 and 12a in abutting relation, member 12a near the meeting line 12b is provided with outstruck tangs 12c, adjacent to the edge of the other member, to prevent either 12 or 12a from slipping past one another, as shown in Fig. 3.

Members 12 and 12a, which move relatively to each other about the line 12b, together form a flexible member for closing over the tube to grip and twist it, and for opening up for ready release of the tube.

Member 12 is cut away for a short distance, as shown at 14, while the outer edges 16 of member 12 fit in and move in channels 6. The extension 12a is provided at each corner with outwardly extending lugs 18 and 20. The inner lugs 18 move, engage in and slide in grooves 6, while the outer lugs 20 move in the groove 6, but also pass into and move along the extension groove 6a.

The enclosure or gripping space defined by members 12 and 12a is lined with a flexible, resilient, non-metallic gripping lining 24, conveniently of sponge or foam rubber, or of any other suitable material.

Fig. 1 shows in dotted lines the tool in tube gripping or closed position, while Figs. 1 and 3 show the tool in tube releasing or open position.

Members 12 and 12a are moved back and forth between the positions shown in full and dotted lines in Fig. 1 about the longitudinal axis through the point 26, representing the center of curvature of the channel 6. This movement is effected by a pair of cables or wires. One of these cables 28 is secured, as at 30, to the outer edge of member 12, this cable passing downwardly into a hollow handle 31 and being secured to one side of a grooved wheel 32, positioned near the lower end of the handle, this wheel being rotatable about the axis 34. Handle 31 shown as broken in Fig. 1, may in practice, be about five to twelve feet long.

A second pull cable 36 is secured, as at 38, to the outer edge of member 12a, the cable 36 passing downwardly through the handle and being secured to the other side of wheel 32. Wheel 32 is manually operated by a handle 39 secured to the pivot 34, for turning the wheel through the necessary angle for moving the tube gripping members 12 and 12a back and forth between positions shown in full and dotted lines in Fig. 1.

The base member 2 carries a pair of downwardly extending brackets 40 and the upper end of the handle 31 is provided with a cooperating bracket 42, a threaded shaft 44 being provided for pivotally securing the two brackets together. A threaded nut 43, which may be loosened and tightened as desired, is used to clamp the head of the tool to the handle at any desired angle. In ordinary use of the tool, the angular relation between the handle and the head is not changed, although by loosening and tightening nut 46 the angular relationship between these parts may be fixed as desired, in order to fit the fixture being serviced.

*Operation*

In order to grip a fluorescent tube or other similar article, for removal thereof, the tool with the parts in the open position shown in Fig. 2 is engaged with the tube, in the wide open position, with the part 12a as shown enabling the tool readily to be engaged with the tube. Handle 39 is now swung clockwise, which pulls on cable 36 to cause 12a to push against 12 and to move 12 and 12a to grip the tube, such movement then continuing to twist the tube through an angle of about 90°, to the dotted line position of Fig. 1. By this time the electrodes on the end of the tube are disengaged from the terminals in the fixture, and the tube can be removed from the fixture simply by a downward movement of the handle 39. A reverse movement of handle 39 pulls on cable 28 to cause members 12 and 12a to move to the open position as in Fig. 3 for ready removal of the tube.

In order to install a new tube, the tube is placed in the tool when it is in the open position of Fig. 1. Handle 39 is manipulated to move the parts to the closed position to grip the tube, or 12 and 12a may be directly moved manually to grip the tube. The tube is inserted into the fixture, and then the handle 39 is operated in the other direction to twist the tube through the necessary 90° for effecting the necessary electrical contact, such movement being continued to move the parts 12 and 12a in the open position of Fig. 3 so that it can readily be removed from further engagement with the tube.

While the present preferred structural details are as just described, it should be understood that the invention is not limited to the precise mechanism as shown, but may be carried out in other ways.

I claim as my invention:

1. A tool for handling fluorescent lighting tubes, comprising a head having a base and arcuate channeled guides at each end of said base, with the channels in the guideways facing each other, a handle secured to said base, an arcuate tube gripping member slidable back and forth in an arcuate path in said channeled guides, cables secured to said tube gripping member for moving it back and forth as described, manually operated means carried by said handle for operating said cables, and means for positioning said head at a desired angle with respect to said handle.

2. The combination as set forth in claim 1, wherein said manually operated means includes a manually operated wheel to which said cables are secured.

3. A tool for handling fluorescent lighting tubes comprising a head having a base and arcuate channeled guides at each end of said base, a handle secured to said base, an arcuate tube gripping member slidable back and forth in said guides in an arcuate path about an axis substantially concentric with the longitudinal axis passing through the center of curvature of said arcuate channeled guides, cables secured to said tube gripping member for moving it back and forth in an arcuate path, manually operated means near the lower part of the handle for operating said cables, and means for variably positioning said head angularly with respect to said handle.

4. A tool for handling fluorescent lighting tubes, comprising a base, an arcuately curved channeled guideway at each end of said base, with the channels in said guideways facing each other, an end portion of each guideway being angled outwardly with respect to the adjacent main portion of the guideway, a curved flexible member having its respective ends slidable in said guideways, and manually operated means for moving said curved flexible member back and forth in said guideway.

5. A tool for handling fluorescent lighting tubes comprising a base member, an arcuately curved channeled guideway at each end of said base member, with the channels in said guideways facing each other, an end portion of each guideway being angled outwardly with respect to the adjacent main portion of the guideway, a handle carried by said base member, a curved flexible tube gripping member having its ends slidable in the said channeled guideways, and manually operated means for moving said curved flexible member back and forth in said guideways.

6. The combination as set forth in claim 5, wherein said flexible tube gripping member comprises two curved members which are angularly movable with respect to each other along their meeting line.

7. The combination as set forth in claim 5, wherein the manually operated means includes pull cables attached to said curved flexible member.

8. The combination as set forth in claim 5, including means for positioning said base member at a desired angle with respect to said handle.

9. The combination as set forth in claim 5, further including a resilient, non-metallic liner carried by and movable with said tube gripping member.

10. A gripping device for gripping a substantially cylindrical article, comprising a base member having arcuately curved, inwardly facing channeled guideways at each end of the base, each of said guideways having a similarly channeled extension angled outwardly with respect to the main portion of the guideway, an arcuately curved gripping member having its ends slidable in the main portion of said guideways, a curved supplementary gripping member having extensions movable both in the channels in the main portion of said guideways and in the channels in said angled extensions, and manual means for simultaneously moving both of said gripping members.

11. A gripping device for gripping a substantially cylindrical article, comprising a base, a curved channeled guideway at each end of said base, each channeled guideway comprising a major portion similarly and uniformly curved, and a minor portion, forming an extension of the major portion of the guideway, angled away from and outwardly of said major portion, with the channels in the respective guideways communicating with each other, a curved flexible member, the ends of which slide in and follow the respective curvatures in the channeled guideways, and manual means for moving said curved flexible member back and forth in said guideways.

12. A gripping device for gripping a substantially cylindrical article, comprising a head having arcuately curved inwardly facing channeled guideways at each end, an outer part of each guideway being angled outwardly with respect to the main part of the guideway, a curved flexible member, the ends of which slide in and follow the respective curvatures of the channeled guideways, and manually operated means for moving said curved flexible member back and forth in said guideways.

JAMES B. MINOR, Sr.

REFERENCES CITED

The following references are of record in the file of this patent:

UNITED STATES PATENTS

| Number | Name | Date |
|---|---|---|
| 363,437 | Thompson | May 24, 1887 |
| 1,444,216 | Sorensen | Feb. 6, 1923 |
| 2,360,396 | Carney | Oct. 17, 1944 |